United States Patent
Renner et al.

(10) Patent No.: US 7,503,438 B2
(45) Date of Patent: Mar. 17, 2009

(54) ELECTROMAGNETICALLY ACTUATED TRANSMISSION BRAKE

(75) Inventors: Stefan Renner, Bodman-Ludwigshafen (DE); Reiner Keller, Ludwigshafen-Bodman (DE); Markus Ulbricht, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 382 days.

(21) Appl. No.: 10/538,726

(22) PCT Filed: Dec. 3, 2003

(86) PCT No.: PCT/EP03/13619

§ 371 (c)(1),
(2), (4) Date: Aug. 15, 2005

(87) PCT Pub. No.: WO2004/055412

PCT Pub. Date: Jul. 1, 2004

(65) Prior Publication Data

US 2006/0060437 A1    Mar. 23, 2006

(30) Foreign Application Priority Data

Dec. 14, 2002    (DE) .............................. 102 58 505

(51) Int. Cl.
*F16D 27/10*    (2006.01)
(52) U.S. Cl. ................. 188/161; 192/84.96
(58) Field of Classification Search ........... 188/71.5, 188/156, 161, 163, 171; 192/84.21, 84.31, 192/84.51, 84.94, 84.96; 310/76, 77
See application file for complete search history.

(56) References Cited

U.S. PATENT DOCUMENTS

| 3,224,540 | A |   | 12/1965 | Straub |
|---|---|---|---|---|
| 3,326,343 | A | * | 6/1967 | Stuckens et al. ......... 192/84.96 |
| 3,368,657 | A | * | 2/1968 | Wrensch et al. .......... 192/84.94 |
| 3,404,762 | A | * | 10/1968 | Leblanc .................... 192/84.91 |
| 4,844,223 | A |   | 7/1989 | Kempf et al. |
| 5,186,288 | A |   | 2/1993 | Sommer |
| 5,490,583 | A | * | 2/1996 | Anderson et al. ........... 188/161 |
| 5,699,883 | A | * | 12/1997 | Albrecht ..................... 188/171 |
| 6,631,779 | B2 | * | 10/2003 | Watson et al. .............. 180/248 |

FOREIGN PATENT DOCUMENTS

| DE | 26 01 121 A1 | 7/1976 |
|---|---|---|
| DE | 26 22 927    | 12/1976 |
| DE | 37 01 744 A1 | 8/1988 |
| DE | 196 52 916 A1 | 6/1998 |
| DE | 198 26 068 A1 | 12/1999 |
| DE | 199 16 955 A1 | 10/2000 |
| EP | 0 735 295 A1 | 3/1996 |

(Continued)

*Primary Examiner*—Christopher P Schwartz
(74) *Attorney, Agent, or Firm*—Davis Bujold & Daniels, P.L.L.C.

(57) ABSTRACT

A transmission brake (1) is described, where one transmission shaft (3) can be braked to carry out an upshift operation. The aim of the invention is to provide a transmission brake that is devoid of any hydraulic or pneumatic actuation device and that requires very little axial installation space. Such a transmission brake (1) has one electromagnetic actuation device (6, 7, 8) with which the friction elements (4, 5) of the transmission brake (1) can be pressed against each other for actuating the brake.

12 Claims, 2 Drawing Sheets

FOREIGN PATENT DOCUMENTS

| | | |
|---|---|---|
| EP | 0 822 354 A2 | 2/1998 |
| EP | 1 136 727 A1 | 9/2001 |
| GB | 1009286 | 11/1965 |
| JP | 56-94051 | 7/1981 |
| SU | 708085 | 1/1980 |

\* cited by examiner

ELECTROMAGNETICALLY ACTUATED TRANSMISSION BRAKE

This application is a national stage completion of PCT/EP2003/013619 filed Dec. 3, 2003 which claims priority from German Application Serial No. 102 58 505.9 filed Dec. 14, 2002.

FIELD OF THE INVENTION

The invention relates to a transmission brake comprising one housing, at least one friction element, non-rotatably situated relative to the housing, and at least one other friction element, fastened upon a transmission shaft to be braked, the same as one actuation device by which one actuation element can be axially pressed against the friction elements.

BACKGROUND OF THE INVENTION

One such transmission brake was disclosed in DE 196 52 916 A1. Therewith it is possible, in an automated transmission in countershaft design, to suitably to decelerate the rotational speed of a countershaft with the gear wheels secured thereupon when, during an upshift operation for rotational speed synchronization, it is needed to reduce the rotational speed of the drive gearwheel of the higher gear. To carry out such deceleration operations, this known transmission brake has discs standing opposite to each other and non-rotatably and axially movably disposed on the end of a countershaft extending into the housing of the transmission brake or on the transmission brake housing. Moreover, in the housing of the transmission brake, one piston-cylinder arrangement is actuatable by pressure means with the piston of which the brake discs can be pressed against each other.

Even though this known transmission brake is in itself very advantageously designed, it still needs a hydraulic pneumatic system which supplies the cylinder of the piston-cylinder arrangement with the pressure needed for actuating the brake. This really is not disadvantageous when there are also components in the vehicle other than the transmission brake which have to be supplied with a hydraulic or pneumatic actuation or control pressure. But since there are also vehicles in which the transmission brake is the only device needing a hydraulic or pneumatic actuation or control pressure, its installation in such a vehicle constitutes a not inconsiderable cost factor. One basic disadvantage of fluid-controlled transmission brakes in piston-cylinder arrangements is, in addition, that they need comparatively much installation space for their added control components (such as magnetic valves) in an area of the vehicle which often is already very cramped.

With this background, the problem on which the invention is based consists in introducing a transmission brake which can be actuated without a pneumatic or hydraulic pressure system and which also requires no large installation space.

The solution of this problem results from the features of the main claim while advantageous developments and embodiments of the invention can be understood from the subclaims.

SUMMARY OF THE INVENTION

Accordingly, departing from a generic transmission brake, it is provided that the friction elements can be pressed against each other by an actuation element which is axially movable by an electromagnetic actuation device. This practical construction of the transmission brake makes it possible to omit a hydraulic or pneumatic system in the motor vehicle.

In one preferred development of the invention, it is provided that the actuation device has one electromagnetically operative toroidal coil at its disposal which, controlled by a transmission control and regulation device, can be supplied with a coil current. In another variant of one toroidal coil, several separate coils also preferably form a circle.

To reduce the installation space needed for the transmission brake, it can be further provided that the transmission brake can be completely or at least partly integrated in the wall of the transmission housing.

In this connection, it is possible that the friction elements are situated at least partly in an aperture of the transmission housing wall into which extends the countershaft to be braked. An optionally overhanging section of the transmission brake, particularly the area that accommodated the toroidal coil, extends partly into the transmission housing or out of it.

The toroidal coil can be fastened in a cover acting as housing for the transmission brake and which, for its part, is connected via fastening means with the transmission housing. The cover can also serve for covering other actuation devices which are fastened on the transmission housing wall. To form a good magnetic flow when loading the toroidal coil with an electric current, this housing is preferably made of a metallic material.

With regard to the friction elements, it can be provided that they be designed as brake discs and be non-rotatably and axially movable situated upon the transmission shaft to be braked or on the transmission housing. For the propose, on the end of the countershaft extending into the housing of the transmission brake, there is made one outer plug-in toothing, while the aperture transmission housing is provided with one inner plug-in toothing. But in another variant of the invention, the friction elements can also be fixed in grooves of the countershaft or of the transmission housing by way of precision pins.

As to the friction areas of the friction elements, it is deemed advantageous that the surface is corrugated, preferably sinusoidally corrugated.

In another variant (version B) of he invention, for actuating the transmission brake and especially for compressing the brake discs that the latter has one armature coordinated with the coil, which is axially movably situated upon the plug-in toothing of the transmission shaft. It is deemed advantageous in this connection to place one ring armature, preferably disc-shaped, upon the transmission shaft, which is axially movable by the coil for compressing the brake discs.

Moreover, upon the side of the transmission brake pointing away from the toroidal coil, one fastening disc can be situated on the plug-in toothing of the transmission housing or one radial spider on the countershaft, which makes possible, or at least supports, a one-sided axial fixing of the ring armature.

BRIEF DESCRIPTION OF THE DRAWING

The invention will now be described, by way of example, with reference to the accompanying drawings in which.

DETAILED DESCRIPTION OF THE INVENTION

Figure 1:
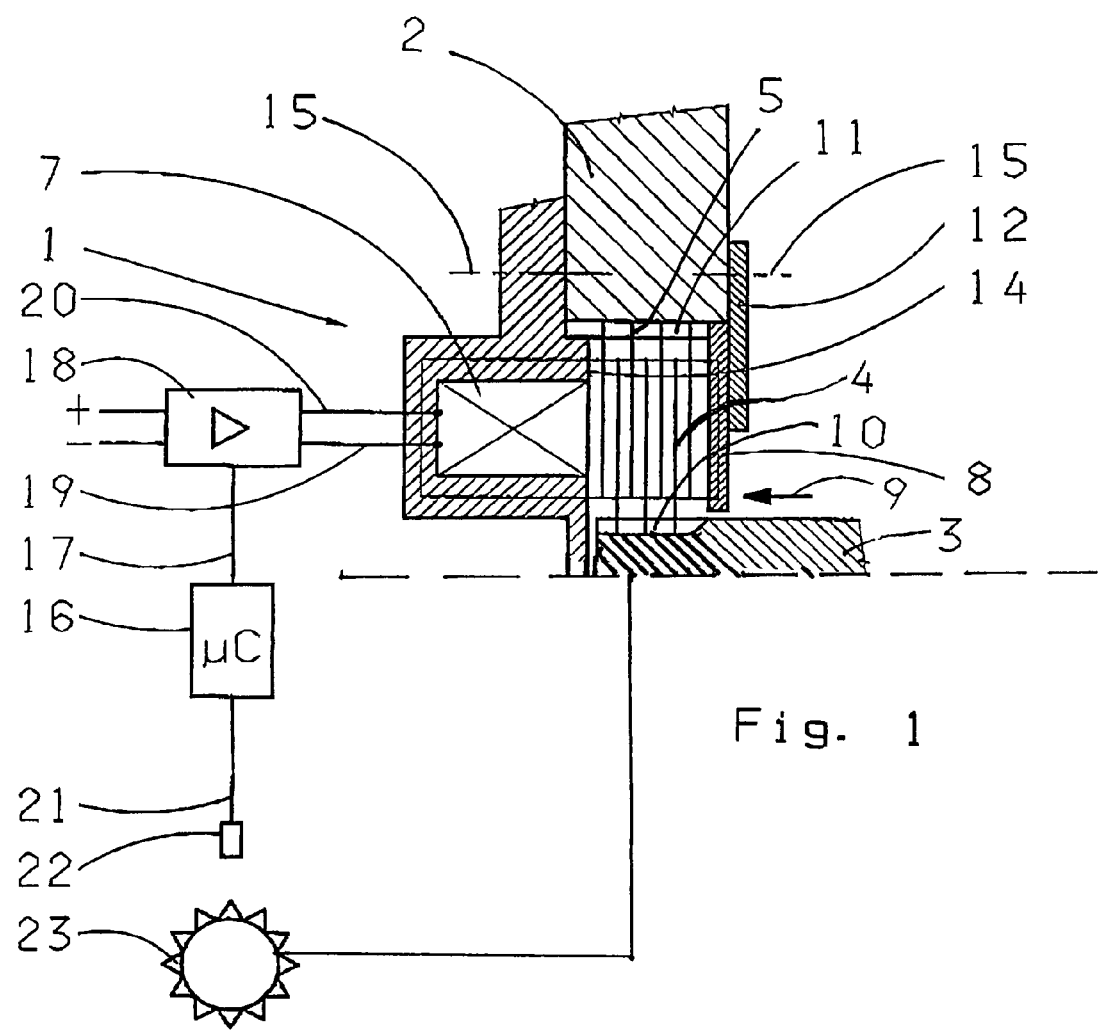
FIG. 1 shows a diagrammatic cross-sectional view of a first embodiment of an electromagnetically actuatable transmission brake.

The transmission brake 1 accordingly extends in part of its axial length into an aperture of a transmission housing 2. In addition, into this transmission brake 1 extends in addition one transmission shaft 3 which has one outer plug-in toothing 10 in the area of the transmission housing wall 2. Upon the outer toothing 10 are non-rotatably and axially movably fastened friction elements 4, pointing radially outwardly and spaced apart from each other. In the intermediate spaces, the radially outwardly pointing friction elements 4 engage radially inwardly pointing friction elements 5, which are non-rotatably and axially movably disposed on the edge of the transmission housing aperture upon an inner plug-in toothing 11. The friction elements 4, 5 are here designed preferably as brake discs.

Pointing away from the transmission shaft in the area of the side of the transmission housing wall 2, a housing 13 of a half wall design is connected with the transmission housing wall 2, via a fastening means 15, only which is indicated here. Within the housing 13 of the transmission brake 1 is situated an electromagnetically operating toroidal coil 6, 7 during the current supply of which an axially acting magnetic force is exerted upon a ring armature 8.

The ring armature 8 is inserted either upon the outer plug-in toothing 10 of the transmission shaft 3 (FIG. 2) or upon the inner plug-in toothing 11 of the transmission housing 2 (FIG. 1) so that, according to an arrow 9, the ring armature 8 can be pressed by the magnetic force axially against the brake discs 4, 5 of the transmission brake 1. At the same time, the axial movement 9 of the ring armature 8 to te coil 6, 7 has an end when all brake discs 4, 5 are pressed against a stop face 14 on the housing 13 of the transmission brake 1. On the other hand, one fastening disc 12, which is fastened in the inner side of the transmission housing 2 or as a radially oriented spider 24 on the transmission shaft 3, limits the axial motion of the ring armature 8 in direction to the interior of the transmission housing 2.

Figure 2:
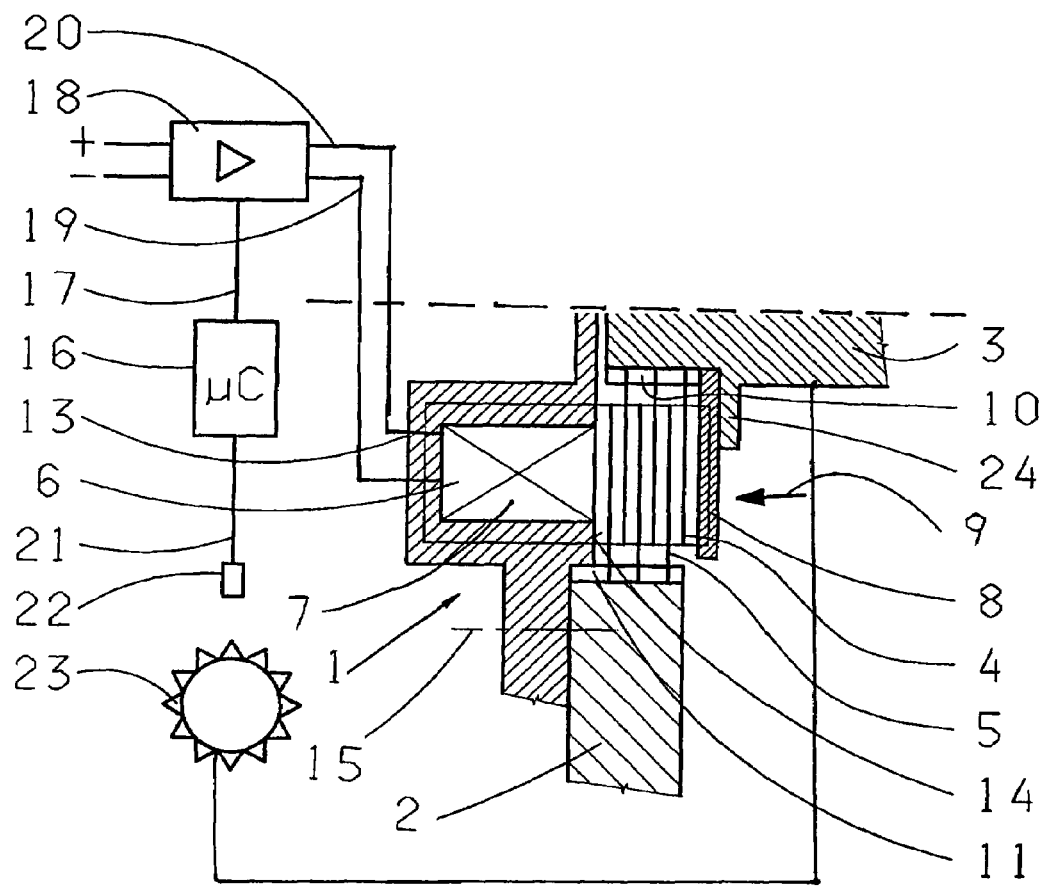
FIG. 2 shows a diagrammatic cross-sectional view of a second embodiment of the electromagnetically actuatable transmission brake.

In addition, the FIGS. 1 and 2 show that the coil 6, 7 is connected, via electric lines 19, 20, with a source of voltage. One control and regulation device 16 coordinated with the transmission brake 1, regulates the current supply of the coil 6, 7 depending on the rotational speed of the transmission shaft 3 to be braked. The drawing diagrammatically shows that this rotational speed can be determined, for example, with the aid of a gear wheel 23 upon the transmission shaft 3 and one rotational speed sensor 22 of which the measuring values are made available via a sensor line 21 of the control and regulation device 16.

As soon as one data processing program stored in the control and regulation device 16 as result, among others, of the measured rotational speed information, has determined that the transmission brake 1 is to be actuated in the sense of releasing or braking the control device 16, via a control line 17, gives a control signal in the form of a pulse width modulated voltage to a toroidal core control current source 18 with which the current supply to the coil 6, 7 can be regulated.

This embodiment makes clear that the transmission brake 1 can also be implemented without a hydraulic or pneumatic actuation device. In addition, the integration of essential parts of the transmission brake 1 in the transmission housing wall 2 allows a very compact design.

The inventive electromagnetic transmission brake 1 also makes very good adjustability of the countershaft rotational speed possible while, with the formerly known transmission brakes actuatable by pressure means, via the control of a magnetic valve of a piston-cylinder arrangement, the desired rotational speed of the countershaft can be controlled only roughly. In particular, by the proposed pulse width modulated regulation voltage, it is possible to adjust a control current in the toroidal coil 6, 7 of the inventive transmission brake 1, which is proportional to the braking force produced by the transmission brake. By way of the rotational speed control of the countershaft 3, it is thus possible to construct a regulation for the whole synchronization operation during a gear change with relative ease.

The advantages of one such regulatable transmission brake are obvious. Thus, for example, a variable brake gradient can be adjusted with which the synchronization cycle is improved during a change of gear. With such a transmission brake, it is further possible also in itself to control switching cycles better than before.

Furthermore, this regulatable transmission brake 1 can react directly to changing friction values of its friction elements 4, 5 and thereby, for example, take into account wear and overheating phenomena. Finally, the regulatable electromagnetic transmission brake 1 can also be used as a vibration damper in the drive train. At the same time, the transmission brake 1 is always briefly actuated when a disturbing increase of a vibration amplitude is felt in the drive train. In this manner, it is possible to omit a separate double solid flywheel when the transmission brake has been adequately laid out.

With the inventive transmission brake 1 is associated the further advantage that as a result of the adjustability thereof the friction element temperature can also be compensated. At the same time, the temperature compensation preferably is already a component of the control and regulation program stored in the control and regulation device.

One other aspect of the invention concerns the regulatable braking force of the transmission brake 1 so that it can be used for different transmissions without important structural changes. Needed adaptations are, as a rule, confined to a change of the control and regulation software in the control and regulation device and, when needed, a change of the number of brake discs.

In one other development of the invention, the brake discs are designed so that their surface are corrugated, preferably sinusoidally corrugated, in peripheral direction. By such a construction, an especially quick loosening of the friction elements 5 from each other results when disconnecting the coil current so that the transmission brake 1, under quick regulation instructions, can react with quick tightening and detaching operation.

With the transmission brake 1 introduced here, it is accordingly possible to always implement an optimal synchronization operation under all marginal conditions.

| | Reference numerals |
|---|---|
| 1 | transmission brake |
| 2 | transmission housing wall |
| 3 | transmission shaft |
| 4 | friction element: inner disc |
| 5 | friction element: outer disc |
| 6 | toroidal coil |
| 7 | toroidal coil |
| 8 | ring armature fastening element |
| 9 | closing direction |
| 10 | outer plug-in toothing |
| 11 | inner plug-in toothing |
| 12 | fastening disc |
| 13 | housing of transmission brake, cover |
| 14 | stop face |
| 15 | fastening means |
| 16 | control line and regulation device |
| 17 | control line |
| 18 | driver stage |
| 19 | electric line |
| 20 | electric line |

-continued

| Reference numerals | |
|---|---|
| 21 | sensor line |
| 22 | rotational speed sensor |
| 23 | gear wheel |
| 24 | spider on transmission shaft |

The invention claimed is:

1. A transmission brake (1), for braking a transmission shaft (3), comprising:
 an outer toothing (10) rotationally fixed to an end of the transmission shaft (3);
 at least one first friction element (4) rotationally fixed on the outer toothing (10); and
 at least one second friction element (5) fixed to the inner toothing (11);
  the outer toothing (10) and the at least one first friction element (4) and the inner toothing (11) and the at least one second friction element (5) all being located within an aperture extending through the transmission housing wall (2);
 an actuation element (8) located within the aperture extending through the transmission housing wall (2) and engaging with one of the at least one friction element (4) and the at least one second friction element (5), when actuated, to exert an axial braking pressure against the at least one first friction element (4) and the at least one second friction element (5); and
 an electromagnetic actuation device (6, 7) for actuating the actuation element (8) and the electromagnetic actuation device (6, 7) being located within a brake housing (13) and fixed to the transmission housing wall coaxially with the aperture extending through the transmission housing wall (2).

2. The transmission brake according to claim 1, wherein the electromagnetic actuation device (6, 7) comprises:
 at least one electromagnetically acting toroidal coil (6, 7) actuated by a regulated coil current having a regulated pulse width and generated by a toroidal core control current source (18) controlled by a regulation device (16).

3. The transmission brake according to claim 2, wherein the regulation device (16) controls the toroidal core control current source (18) so that the transmission brake operates as a vibration damper in a drive train.

4. The transmission brake according to claim 3, wherein the vibration damper is a torsional vibration damper.

5. The transmission brake according to claim 1, wherein the at least one electromagnetically actuated toroidal coil (6, 7) comprises:
 a plurality of separate toroidal coils (6, 7) disposed in the brake housing (13) and arranged circumferentially about the aperture extending through the transmission housing wall (2).

6. The transmission brake according to claim 1, wherein the brake housing (13) is a half-shell housing (13) which has an open side mating with the transmission housing wall (2).

7. The transmission brake according to claim 1, wherein the first friction element (4) is axially moveable on the transmission shaft (3) and the second friction element (5) is axially moveable on the transmission housing (2).

8. The transmission brake according to claim 1, wherein the first and second friction elements (4, 5) are brake discs.

9. The transmission brake according to claim 1, wherein the actuation element (8) is a ring armature.

10. The transmission brake according to claim 1, wherein the first and second friction elements (4, 5) on the transmission housing (2) and on the transmission shaft (3), under the action of the magnetic forces generatable by the toroidal coils (6, 7), can be pressed by the actuation element (8) in a direction toward a stop face (14) fixed to the transmission brake housing (13) in the area of the toroidal coils (6, 7).

11. The transmission brake according to claim 1, wherein the transmission shaft (3) is a countershaft of one of an automatic or automated mechanical transmission.

12. The transmission brake according to claim 1, wherein a regulation device (16) controls the toroidal core control current source (18) so that variable brake gradients can be adjusted on the transmission brake (1).

* * * * *